(12) United States Patent
Spinella et al.

(10) Patent No.: US 8,981,834 B2
(45) Date of Patent: Mar. 17, 2015

(54) CIRCUIT AND METHOD FOR DYNAMIC OFFSET COMPENSATION IN A MEMS SENSOR DEVICE

(71) Applicant: STMicroelectronics S.r.l., Agrate Brianza (IT)

(72) Inventors: Giuseppe Spinella, Biancavilla (IT); Daniele De Pascalis, Cornaredo (IT); Marco Vito Sapienza, Catania (IT); Maria Ceravolo, Milan (IT); Eugenio Miluzzi, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 14/134,972

(22) Filed: Dec. 19, 2013

(65) Prior Publication Data
US 2014/0176231 A1 Jun. 26, 2014

(30) Foreign Application Priority Data
Dec. 20, 2012 (IT) .............................. TO2012A1116

(51) Int. Cl.
*H01L 41/00* (2013.01)
*G05F 1/625* (2006.01)
*G01P 15/125* (2006.01)
*G01D 5/244* (2006.01)

(52) U.S. Cl.
CPC .............. *G05F 1/625* (2013.01); *G01P 15/125* (2013.01); *G01D 5/2448* (2013.01)
USPC .......................................... 327/516; 327/530

(58) Field of Classification Search
USPC .................................. 327/509, 516, 530, 534
See application file for complete search history.

(56) References Cited

U.S. PATENT DOCUMENTS

| | | | |
|---|---|---|---|
| 6,035,694 A | 3/2000 | Dupuie et al. | |
| 7,461,553 B2 * | 12/2008 | Lasalandra et al. | 73/514.18 |
| 7,595,648 B2 * | 9/2009 | Ungaretti et al. | 324/678 |
| 8,186,218 B2 * | 5/2012 | Nozawa | 73/504.12 |
| 8,539,834 B2 * | 9/2013 | Prandi et al. | 73/504.12 |
| 8,714,012 B2 * | 5/2014 | Caminada et al. | 73/504.12 |
| 2010/0219848 A1 | 9/2010 | Gotoh et al. | |

FOREIGN PATENT DOCUMENTS

WO 2008/091722 A1 7/2008

* cited by examiner

*Primary Examiner* — Jeffrey Zweizig
(74) *Attorney, Agent, or Firm* — Seed IP Law Group PLLC

(57) ABSTRACT

An offset-compensation circuit in a MEMS sensor device, provided with a micromechanical detection structure that transduces a quantity to be detected into an electrical detection quantity, and with an electronic reading circuit, coupled to the micromechanical detection structure for processing the electrical detection quantity and supplying an output signal, which is a function of the quantity to be detected. A compensation structure is electrically coupled to the input of the electronic reading circuit and can be controlled for generating an electrical compensation quantity, of a trimmable value, for compensating an offset on the output signal; the compensation circuit has a control unit, which reads the output signal during operation of the MEMS sensor device; obtains information on the offset present on the output signal itself; and controls the compensation structure as a function of the offset information.

21 Claims, 5 Drawing Sheets

CIRCUIT AND METHOD FOR DYNAMIC OFFSET COMPENSATION IN A MEMS SENSOR DEVICE

BACKGROUND

1. Technical Field

The present disclosure relates to a circuit and a method for dynamic offset compensation in a MEMS sensor device.

2. Description of the Related Art

Known to the art are sensor devices including micromechanical structures made, at least in part, of semiconductor materials and using MEMS (Micro Electro Mechanical Systems) technology.

These sensor devices are integrated in portable electronic apparatuses, such as, for example, portable computers, laptops or ultrabooks, PDAs, tablets, mobile phones, smartphones, digital audio players, photographic or video cameras, and consoles for videogames, affording considerable advantages as regards the occupation of space, in terms of area and thickness.

The sensor devices generally comprise: a micromechanical sensing structure, designed to transduce a mechanical quantity to be detected (for example, a linear or angular acceleration, a pressure, an ensemble of acoustic waves, etc.) into an electrical quantity (for example, a capacitive variation); and an electronic reading circuit, designed to carry out appropriate processing operations (amongst which amplification and filtering operations) of the electrical quantity so as to supply an output electrical signal, either analog (for example, a voltage) or digital (for example, a pulse-density-modulation—PDM-signal).

This electrical signal, possibly further processed by an electronic interface circuit, is then made available for an external electronic system, for example a microprocessor control circuit of an electronic apparatus incorporating the sensor device.

The micromechanical sensing structure in general comprises one or more mobile parts, which are able to undergo deformation or to perform one or more detection movements in the presence of corresponding mechanical quantities to be detected.

In the case of capacitive detection structures, first electrodes are fixedly associated to the mobile part, and set facing second, fixed, electrodes, thereby providing the plates of a detection capacitor element, the capacitance of which is variable as a function of the quantity to be detected.

In a known manner, an offset signal is superimposed on the useful signal at output from the sensor device (i.e., a deviation with respect to the useful signal), with a d.c. frequency contribution, the value of which depends on the manufacturing process used and moreover on the thermal and mechanical stresses to which the sensor device is subject during operation. These stresses are, for example, induced through the package of the sensor device, in particular on account of the different thermal expansion coefficients of the various materials used.

In the worst case, the value of the offset signal may cause the electronic reading circuit to work outside the dynamic range for which it is designed, thus causing errors, for example, saturation thereof, or the impossibility of measuring the mechanical quantities to be detected.

Solutions have thus been proposed for offset compensation and cancelling, which envisage, in particular, trimming of appropriate circuit parameters and electrical elements, for example, variable and trimmable resistors or capacitors, at the end of the manufacturing process of the micromechanical sensing structure.

The above solutions envisage, for example, the use of an offset-compensation structure at input to the electronic reading circuit, designed to generate an unbalancing that is equal and opposite to the one generated by the offset due to the micromechanical sensing structure, in such a way as to compensate, and ideally eliminate, the effects thereof. For example, in the case of a micromechanical sensing structure of a capacitive type, this unbalancing may be constituted by a variation of charge injected at input to the electronic reading circuit.

These solutions do not enable, however, compensation of a variation in time of the offset, which occurs during use of the sensor device, for example on account of the possible thermal and mechanical stresses to which it is subjected.

In this regard, the ever-increasing demand for a reduction in the dimensions of MEMS sensor devices entails a corresponding reduction of the value of the electrical quantities detected (which may, for example, reach values in the region of some tens of attofarads, aF, in the case of capacitive sensing structures).

Consequently, the aforesaid offset variations may be comparable to, if not even higher than, the useful electrical signal, thus making it difficult, if not unfeasible, the execution of measurements and detection operations.

In other words, the offset issue is increasingly more critical as the dimensions of the MEMS sensor devices decrease, given that the size reduction entails an increase in the sensitivity to stresses and a decrease in the transduction gain and hence in the detected electrical signal.

BRIEF SUMMARY

The present disclosure is directed to providing a solution that will overcome, at least in part, the offset problem in dynamic conditions, i.e., during operation of the MEMS sensor devices.

According to the present disclosure, a device, a circuit, and a method for offset compensation are consequently provided. One embodiment of the device includes a MEMS sensor configured to generate an electrical detection quantity, a reading circuit coupled to the MEMS sensor and configured to process the electrical detection quantity and configured to generate an output signal, and an offset-compensation circuit. The offset compensation circuit includes a compensation structure coupled to an input of the reading circuit and configured to generate an electrical compensation quantity that is configured to compensate for an offset on the output signal and a control unit coupled to the compensation structure and configured to control the compensation structure, the control unit being configured to receive the output signal, to obtain offset information about the offset, and to generate control the compensation structure as a function of the offset information.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
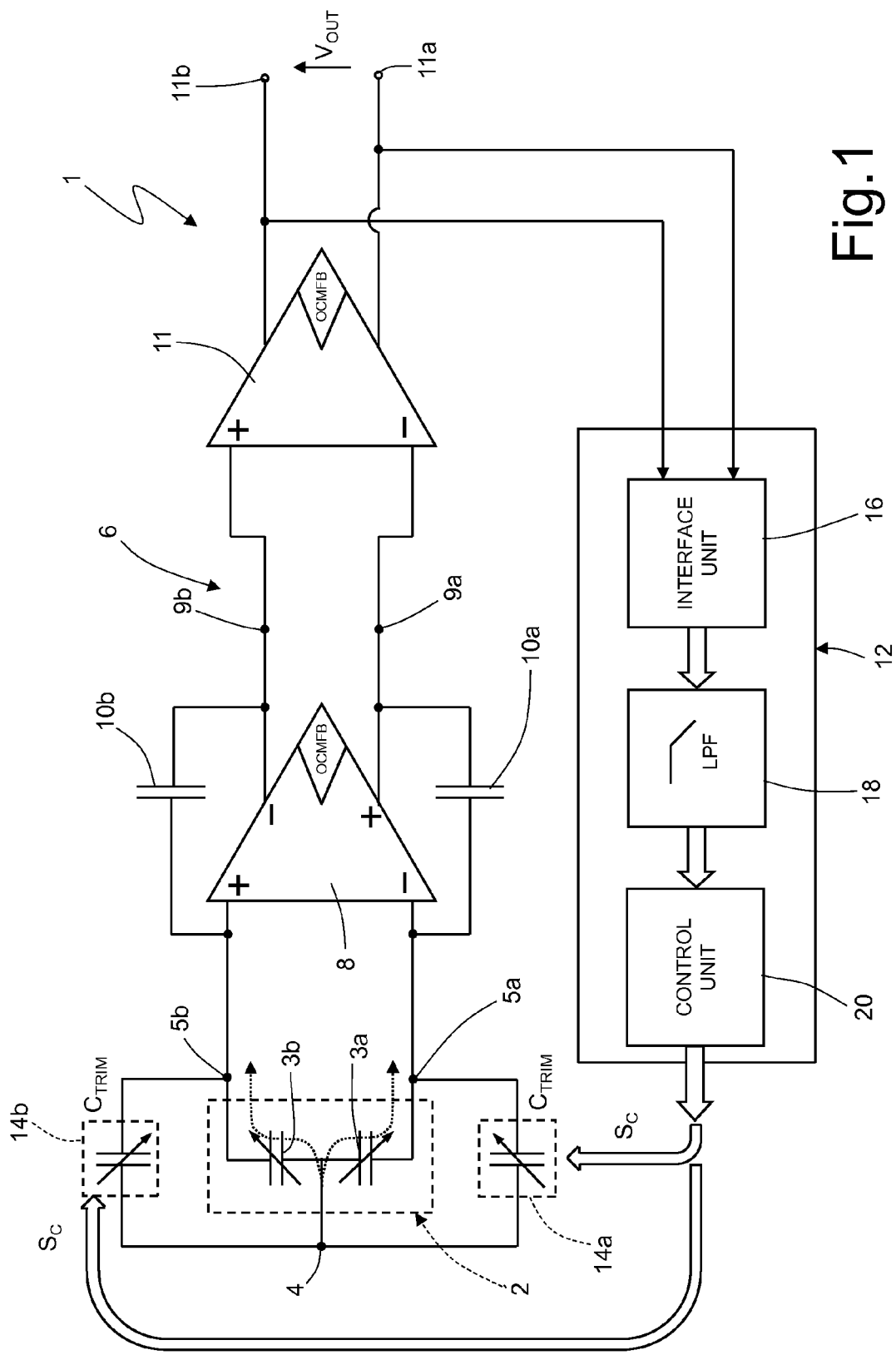
FIG. 1 is a schematic circuit diagram of a MEMS sensor device, provided with an offset-compensation circuit, according to the present solution.

FIG. 1 shows a MEMS sensor device 1, comprising a micromechanical sensing structure 2, in the example of a capacitive type; the equivalent electrical diagram is shown, including a first detection capacitor 3a and a second detection capacitor 3b, which have capacitances that vary in an opposite way as a function of a quantity to be detected, for example a linear acceleration.

The first and second detection capacitors 3a, 3b have a first terminal 4 in common, in particular a mobile terminal, the so-called "rotor terminal", electrically connected to which are the mobile plates of the capacitors, and a respective fixed (mechanically constrained) terminal 5a, 5b, in particular a so-called "stator terminal", electrically connected to which are the respective fixed plates.

The MEMS sensor device 1 further comprises an electronic reading circuit 6, in particular made in an integrated manner using semiconductor technologies, i.e., an ASIC (Application-Specific Integrated Circuit).

The micromechanical sensing structure 2 and the electronic reading circuit 6 may, for example, be integrated, each, in a respective die of semiconductor material, for example including silicon, and be housed in one and the same package, which constitutes the coating thereof and defines the electrical contacts thereof towards the outside world. Alternatively, the micromechanical sensing structure 2 and the electronic reading circuit 6 may be integrated in one and the same die of semiconductor material.

The electronic reading circuit 6 comprises a charge-amplifier stage 8, in fully differential configuration with output common-mode feedback (OCMFB) stage, having its inverting input terminal connected to the fixed terminal 5a of the first detection capacitor 3a, and its non-inverting input terminal connected to the fixed terminal 5b of the second detection capacitor 3b.

The charge-amplifier stage 8 moreover has a first output 9a and a second output 9b, and a first amplification capacitor 10a, connected between the first output 9a and the inverting input terminal, and a second amplification capacitor 10b, connected between the second output 9b and the non-inverting input terminal of the same charge-amplifier stage 8.

The electronic reading circuit 6 further comprises an amplification stage 11, including a fully differential amplifier, which is also provided with an OCMFB stage, having its inverting input terminal connected to the first output 9a, and its non-inverting input terminal connected to the second output 9b, of the charge-amplifier stage 8.

The amplification stage 11 moreover has a respective first output 11a and a respective second output 11b, between which it supplies an output signal $V_{out}$, for example a voltage, having a value indicative of the quantity to be detected.

The electronic reading circuit 6 further comprises an offset-compensation stage 12 (in particular, made in an integrated manner, in one and the same die with the electronic reading circuit 6), feedback connected between the first and second outputs 11a, 11b of the amplification stage 11 and the inverting and non-inverting terminals of the charge-amplifier stage 8.

The offset-compensation stage 12 comprises trimming elements 14a, 14b, connected to the inverting and non-inverting terminals of the charge-amplifier stage 8, and configured in such a way as to generate on the same inverting and non-inverting terminals an unbalancing quantity, ideally equal and opposite to the one generated by the offset, thereby compensating and ideally eliminating the effects thereof.

For example, in the case illustrated, in which the micromechanical sensing structure 2 is of a capacitive type, this unbalancing is constituted by a variation of charge injected at input to the electronic reading circuit 6, and the trimming elements 14a, 14b include a respective capacitor with trimmable capacitance, the so-called "trimcap" (from the words "capacitor" and "trimmable").

Each trimcap 14a, 14b has: a first terminal and a second terminal, between which it provides a variable capacitance $C_{TRIM}$ of a selectable value; and a control terminal, on which it receives a control signal $S_c$, for example of a digital type, which determines the value of the aforesaid variable capacitance $C_{TRIM}$. The first and second trimcaps 14a, 14b are designed to generate, as a function of the respective variable capacitance $C_{TRIM}$, respectively, a first compensation quantity and a second compensation quantity, in this case constituted by variations of a charge injected at a respective input of the charge-amplifier stage 8.

In greater detail, a first terminal of each trimcap 14a, 14b is connected to the mobile terminal 4 of the micromechanical sensing structure 2, whereas the second terminal of the first and second trimcaps 14a, 14b is connected, respectively, to the inverting terminal and to the non-inverting terminal of the charge-amplifier stage 8.

The offset-compensation stage 12 further comprises, connected in cascaded fashion between the outputs 11a, 11b of the amplification stage 11 and the control terminals of the trimming elements 14a, 14b: an interface unit 16, which receives the output signal $V_{out}$; a low-pass-filtering (LPF) unit 18, which receives the output signal $V_{out}$, possibly pre-processed by the interface unit 16, and extracts the low-frequency or very-low-frequency components thereof, ideally just the d.c. component, due to the presence of the offset and indicative of the value of the same offset at the output; and a control unit 20, which receives the output of the low-pass-filtering unit 18 and generates the control signal $S_c$, as a function of the value of the low-frequency component (representing the offset acting on the MEMS sensor device 1).

According to one aspect of the present solution, the control unit 20 implements an algorithm for control and continuous compensation of the offset present on the output signal $V_{out}$, generating, by means of the trimcaps 14a, 14b, a suitable unbalancing on the input of the electronic reading circuit 6, which is a function of the value of the same offset present at the output. In this manner, it may be possible to compensate dynamically offset variations that might occur during use of the MEMS sensor device 1, for example on account of thermal and/or mechanical stresses.

In particular, the control unit 20 is configured for implementing a threshold control, i.e., for comparing the value of the offset extracted from the output signal $V_{out}$ with one or more reference threshold values, indicative of a selected offset value allowed on the output (for example, a value such that the output signal $V_{out}$ itself does not depart from the allowed dynamic range), and for generating the control signal $S_c$ for the trimcaps 14a, 14b, as a function of the result of the comparison (thus adapting the amount of trimming on the basis of the distance of the offset value at output from the selected reference value).

Figure 2:
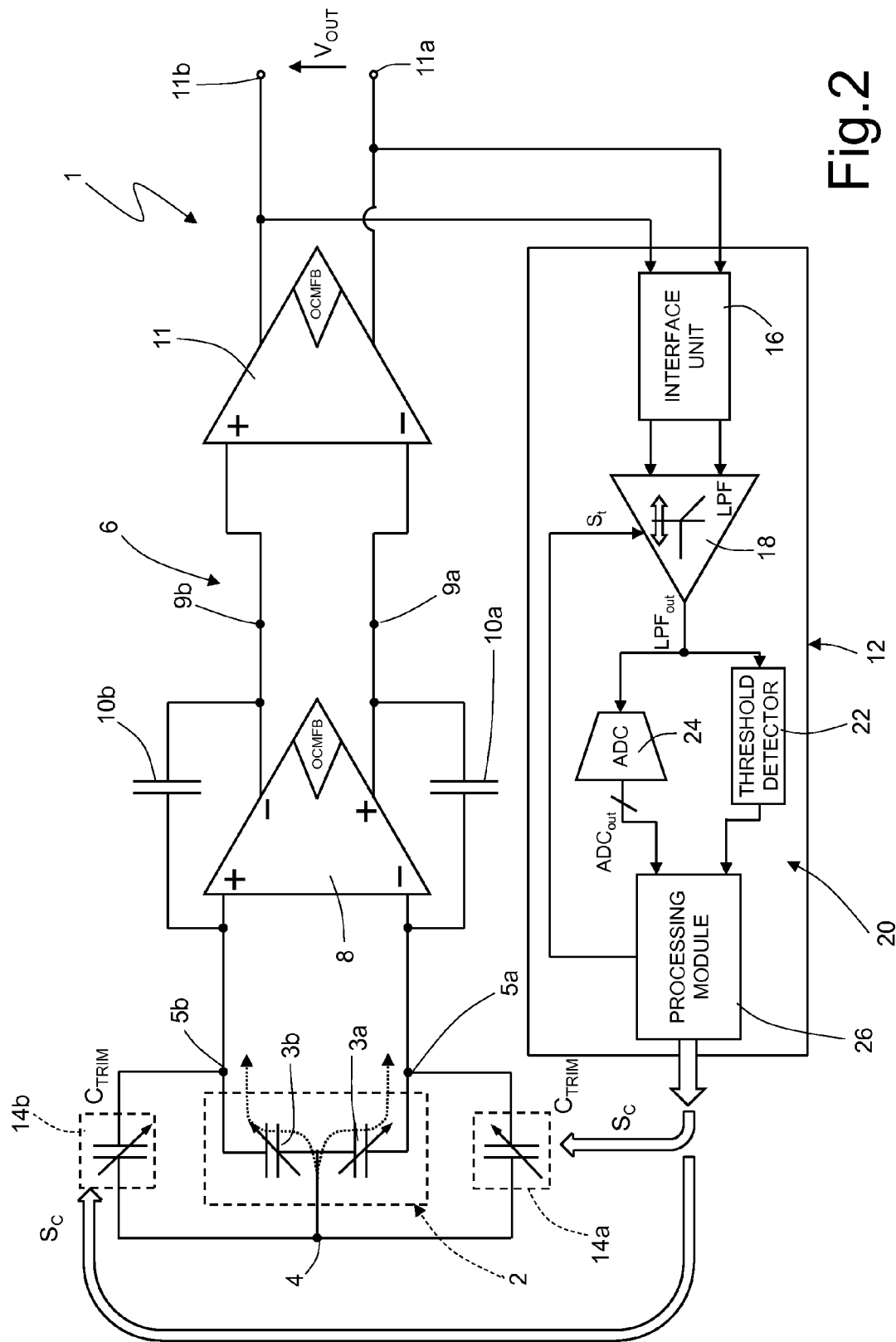
FIG. 2 is a more detailed circuit diagram, showing one embodiment of the offset-compensation circuit.

FIG. 2 shows in greater detail a possible embodiment of the control unit 20; in this embodiment, the low-pass-filtering unit 18 is configured to have a cutoff frequency that may be adjusted as a function of a control signal $S_f$, for example, in the range of values comprised between 0.1 Hz and 3 kHz.

In general, in this embodiment, the control unit 20 operates to implement an algorithm for adaptive offset compensation, controlling the cutoff frequency of the low-pass-filtering unit 18 so as to achieve each time the best compromise between the speed of the operation of offset compensation and the accuracy of the same compensation operation.

In the case where the d.c. error, or distance, between the value of the offset at output and the selected reference value is high, the algorithm envisages implementation of a fast correction by selection of a higher value of the cutoff frequency of the low-pass-filtering unit 18, at the expense of accuracy and of the residual error, resulting from the compensation operation. Instead, when the error between the value of the offset at output and the selected reference value is small, the algorithm envisages implementation of a slower correction, by selection of a lower value of the cutoff frequency of the low-pass-filtering unit 18, thus obtaining a greater accuracy and a smaller residual error.

In detail, the control unit 20 comprises in this case a threshold-detector module 22, which receives at input the filtered output signal from the low-pass-filtering unit 18, designated by $LPF_{out}$, and is configured for comparing this signal with a plurality of threshold values having a pre-set value, and in particular with a first threshold value $V_{t1}$ and with a second threshold value $V_{t2}$, both indicative of reference offset values, with $V_{t2} > V_{t1} > 0$; the threshold-detector module 22 supplies at output one or more comparison signals, indicative of the result of the comparison.

The control unit 20 further comprises an ADC module 24 and a processing module 26.

The ADC module 24 receives the filtered output signal $LPF_{out}$ from the low-pass-filtering unit 18, indicative of the value of offset on the output signal $V_{out}$, and is configured to carry out analog-to-digital conversion thereof, for example, supplying a converted digital signal $ADC_{out}$ with a number of bits equal to four.

The processing module 26, of a digital type, receives at input both the comparison signal from the threshold-detector module 22 and the converted digital signal $ADC_{out}$ supplied by the ADC module 24, and, as a function of these signals, generates the control signal $S_c$ for the trimming elements 14a, 14b, to implement compensation of the output offset; the control signal $S_c$ is, for example, a 12-bit digital signal: $S_c[b_0, b_1, \ldots, b_{11}]$.

In particular, the processing module 26 is configured to implement three different compensation modes, according to the operating condition detected:

a fast-compensation mode, which is carried out upon power-on or upon exit from the power-down (or standby) mode of the MEMS sensor device 1, and which consists in a fast action of correction for bringing back the circuit within the allowed dynamic range, with a high cutoff frequency of the low-pass-filtering unit 18, for example 100 Hz; as will be described in detail hereinafter, the fast-compensation mode is carried out at a high operating frequency $f_{op}$, for example equal to 300 Hz, and implements a binary search that involves the bits of the control signal $S_c$, with a final residual error due to the ADC module 24, equal to $LSB_a/2$ (where $LSB_a$ is the least significant bit of the ADC module 24);

a recovery compensation mode, of a fast type, with a cutoff frequency of the low-pass-filtering unit 18 of, for example, 50 Hz, lower than that of the fast-compensation mode, which is carried out when the filtered output signal $LPF_{out}$ is greater, in absolute value, than the second threshold value $V_{t2}$; as will be described in detail hereinafter, the recovery compensation mode is executed in iterative steps at an operating frequency $f_{op}$, lower than that of the fast-compensation mode, for example 150 Hz, each time varying the value of the filtered output signal $LPF_{out}$ by an incremental variation equal to the value of the least significant bit (designated by $LSB_b$) of the control signal $S_c$, with a residual error that is equal to $\pm V_{t1}$; and a slow-compensation mode, with a low cutoff frequency of the low-pass-filtering unit 18, for example, 0.5 Hz, which is executed when the filtered output signal $LPF_{out}$ is comprised, in absolute value, between the first and second threshold values $V_{t1}, V_{t2}$; as will be described in detail hereinafter, the slow-compensation mode is executed in iterative steps at an operating frequency $f_{op}$, lower than that of both of the previous compensation modes, for example, 1.5 Hz, each time varying the value of the filtered output signal $LPF_{out}$ by the incremental variation equal to the value of the least significant bit (designated by $LSB_b$) of the control signal $S_c$, with a residual error that is once again equal to $\pm V_{t1}$.

Figure 3:
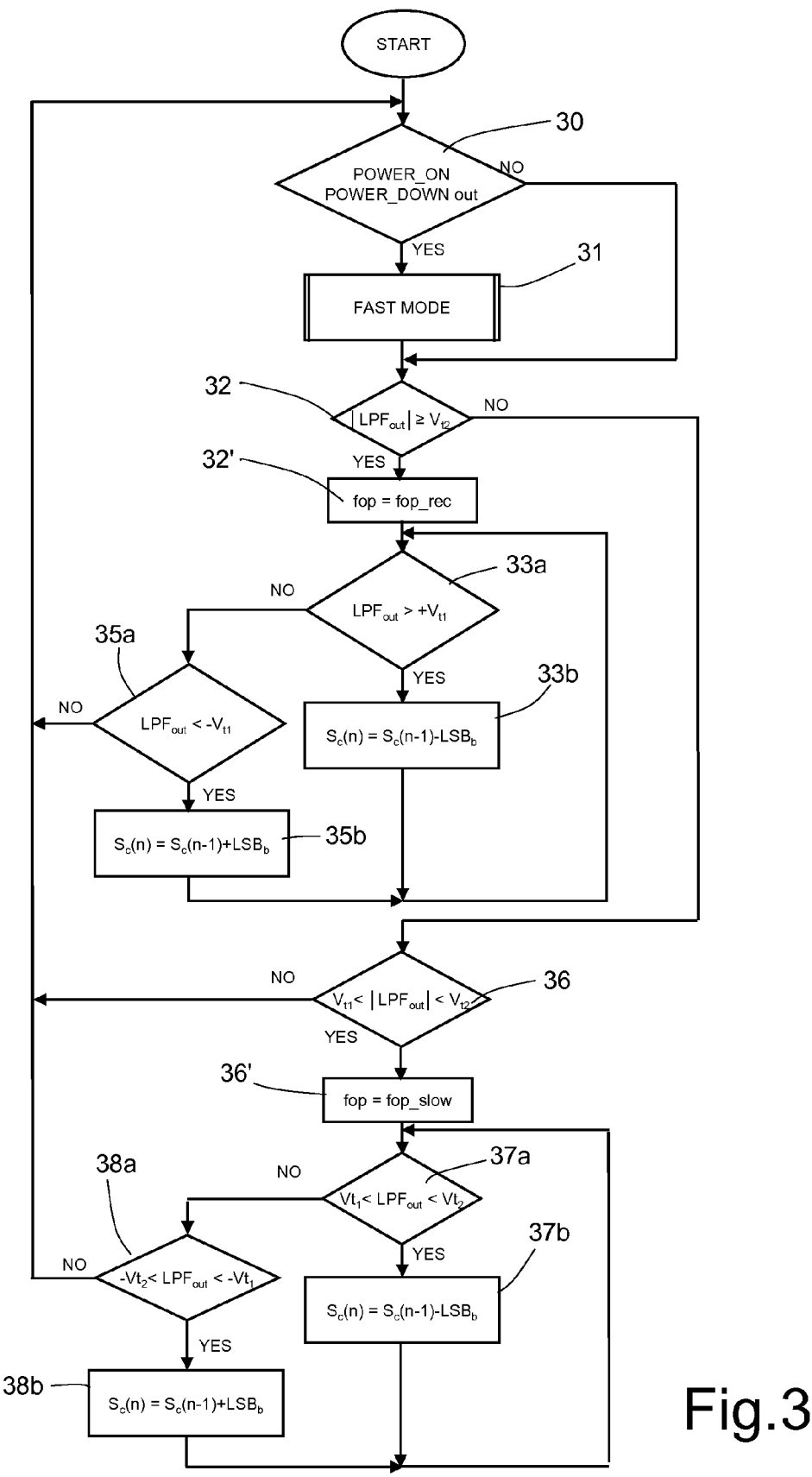
FIGS. 3 and 4 are flowcharts regarding an offset-compensation method implemented in the circuit of FIG. 2.

In greater detail, and with reference to FIG. 3, the compensation algorithm implemented by the processing module 26, for example by executing appropriate software instructions within a microprocessor, microcontroller, or similar computing unit, envisages a first step 30, in which a check is made to verify whether the MEMS sensor device 1 is in an operating condition of power-on or of exit from the condition of power-down or stand-by (condition referred to as "power-down out").

In the case where this check is positive, in a step 31 the fast-compensation mode is carried out, as a function of the converted digital signal $ADC_{out}$ at output from the ADC module 24.

Figure 4:
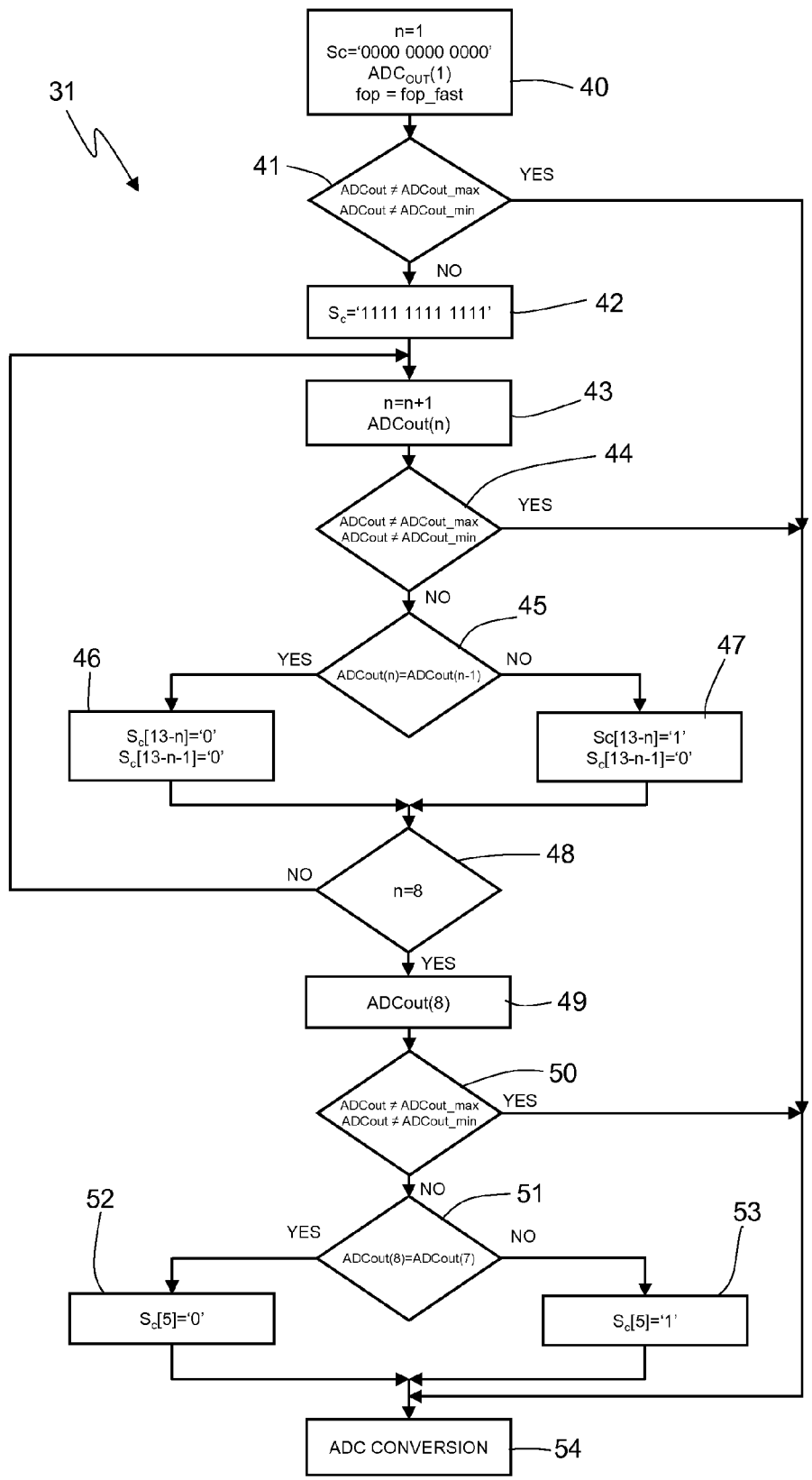

In a possible embodiment, shown in FIG. 4, the fast-compensation mode is carried out in a certain number of iterative processing steps, for example nine steps, executed at the operating frequency $f_{op}$ proper to the same compensation mode.

In a first step (step 40), a counter n is initialized, which is set to 1, and a first value $ADC_{out}(1)$ of the converted digital signal $ADC_{out}$ is read and stored, for a first value of the control signal $S_c$ '0000 0000 0000', with all the bits $b_0$-$b_{11}$ at '0'. The operating frequency $f_{op}$ is moreover set at a selected value $f_{op\_fast}$, for example 300 Hz.

If the first value $ADC_{out}(1)$ (step 41), is different from a maximum output value $ADC_{out\_max}$ or from a minimum output value $ADC_{out\_min}$ allowed by the ADC module 24, the algorithm proceeds to a final step, described hereinafter.

Otherwise (step 42), the value of the control signal $S_c$ is set at '1111 1111 1111', with all the bits $b_0$-$b_{11}$ at '1'.

For the steps of the algorithm 2 to 8, the value of the counter n is incremented (step 43), and a corresponding value $ADC_{out}(n)$ of the converted digital signal $ADC_{out}$ is read and stored.

Once again, if this value $ADC_{out}(n)$ (step 44), differs from the maximum output value $ADC_{out\_max}$ or from the minimum output value $ADC_{out\_min}$, the algorithm proceeds to its final step.

Otherwise (step 45), if a current value $ADC_{out}(n)$ is equal to a previous value $ADC_{out}(n-1)$ of the converted digital signal $ADC_{out}$, in a step 46, the bits $b_{13-n}$ and $b_{13-n-1}$ of the control signal $S_c$, are set at '0'.

Otherwise (step 47), the bit $b_{13-n}$ of the control signal $S_c$ is set at '1', whereas the bit $b_{13-n-1}$ of the same control signal $S_c$ is set at '0'.

After the last step (n=8) is carried out, as verified in step 48, a current value $ADC_{out}(8)$ of the converted digital signal $ADC_{out}$ is read and stored (step 49).

Once again, if this value $ADC_{out}(8)$ (step 50) differs from the maximum output value $ADC_{out\_max}$ or from the minimum output value $ADC_{out\_min}$ allowed by the ADC module 24, the algorithm proceeds to its final step.

Otherwise (step 51), if the current value $ADC_{out}(8)$ of the converted digital signal $ADC_{out}$ is equal to the previous value $ADC_{out}(7)$, in a step 52, the bit $b_5$ of the control signal $S_c$ is set at '0'.

Instead, i.e., if the current value $ADC_{out}(8)$ of the converted digital signal $ADC_{out}$ is not equal to the previous value $ADC_{out}(7)$, the bit $b_5$ of the control signal $S_c$ is set at '1'.

In its final step (step 54) (which is reached also from the aforesaid steps 41, 44 and 50), the algorithm envisages final analog-to-digital conversion of the filtered output signal $LPF_{out}$, for generation of the corresponding control signal $S_c$ for compensation of the offset on the output signal $V_{out}$ with a residual error smaller, in absolute value, than half the value of the least significant bit $LSB_a$ of the ADC module 24.

Figure 5:
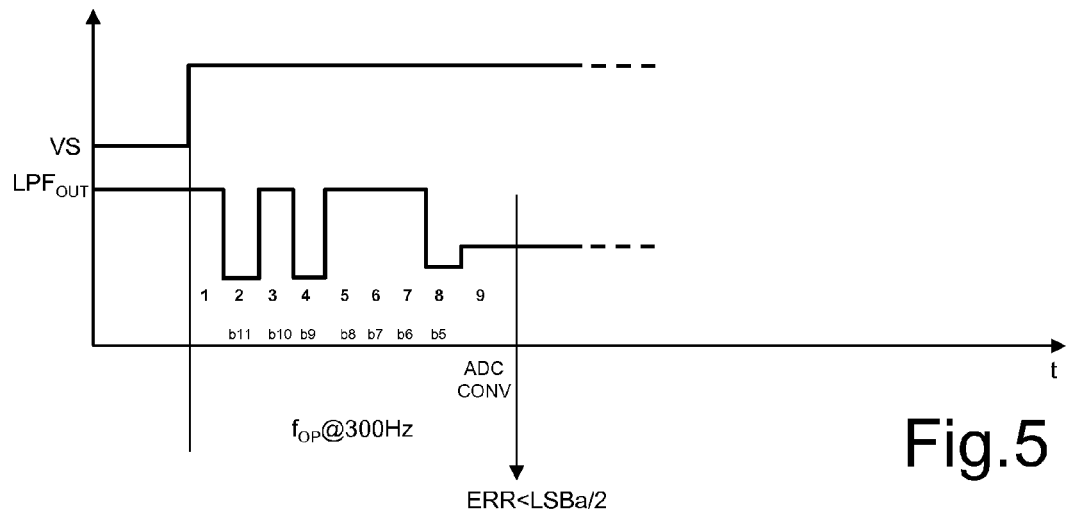
FIGS. 5 and 6 show plots of electrical quantities regarding the circuit and method for offset compensation.

Operation of the algorithm previously described is represented by way of example in FIG. 5, which shows the plot of the filtered output signal $LPF_{out}$ during the fast-compensation mode, which is activated when a digital signal VS switches its value (in the example from low to high), indicating the operating condition of power-on or power-down out. Highlighted in the same FIG. 5 are steps 1 to 9 of the algorithm, and moreover the bits of the control signal $S_c$ each time involved by the same algorithm.

Returning now to FIG. 3, the compensation algorithm implemented by the processing module 26 executes the recovery compensation mode, in the case where it is found (step 32) that the filtered output signal $LPF_{out}$ is, in absolute value, greater than or equal to the second threshold value $V_{t2}$.

The operating frequency $f_{op}$ is set at a selected value $f_{op\_rec}$, for example 150 Hz (step 32').

The above operating mode is interrupted, to return to the initial step 30, when the condition $|LPF_{out}| \leq V_{t1}$ is verified.

It should be noted that the above, and similar, checks are executed by the processing module 26 according to the comparison signal supplied by the threshold-detector module 22.

In the recovery operating mode, if the current value of the filtered output signal $LPF_{out}$ is higher than the first threshold value $+V_{t1}$ (step 33a), namely, $$LPF_{out} > +V_{t1}$$

the current digital value of the control signal $S_c$ is decremented by an amount equal to the value of the least significant bit $LSB_b$ (step 33b)

$$S_c(n)=S_c(n-1)-LSB_b$$

If, instead, the current value of the filtered output signal $LPF_{out}$ is lower than the first threshold value, negated, $-V_{t1}$ (step 35a), namely, $$LPF_{out} < -V_{t1}$$

the current digital value of the control signal $S_c$ is incremented by the same amount equal to the value of the least significant bit $LSB_b$ (step 35b)

$$S_c(n)=S_c(n-1)+LSB_b$$

In addition, the compensation algorithm implemented by the processing module 26 performs the slow-compensation mode, in the case where it is found (step 36) that the filtered output signal $LPF_{out}$ is, in absolute value, comprised between the first threshold value $V_{t1}$ and the second threshold value $V_{t2}$.

The operating frequency $f_{op}$ is set at a selected value $f_{op\_slow}$, for example, 1.5 Hz (step 36').

The above operating mode is interrupted, to return to the initial step 30, when the condition $|LPF_{out}| \leq V_{t1}$ is verified.

In this slow operating mode, if the current value of the filtered output signal $LPF_{out}$ is positive and comprised between the first and second threshold values (step 37a), namely, $$+V_{t1} < LPF_{out} < +V_{t2}$$

the current digital value of the control signal $S_c$ is decremented by an amount equal to the value of the least significant bit $LSB_b$ (step 37b)

$$S_c(n)=S_c(n-1)-LSB_b$$

If, instead, the current value of the filtered output signal $LPF_{out}$ is negative and comprised between the second threshold value, negated, $-V_{t2}$, and the first threshold value, negated, $-V_{t1}$ (step 38a), namely, $$-V_{t2} < LPF_{out} < -V_{t1}$$

the current digital value of the control signal $S_c$ is incremented by the same amount equal to the value of the least significant bit $LSB_b$ (step 38b):

$$S_c(n)=S_c(n-1)+LSB_b$$

Figure 6:
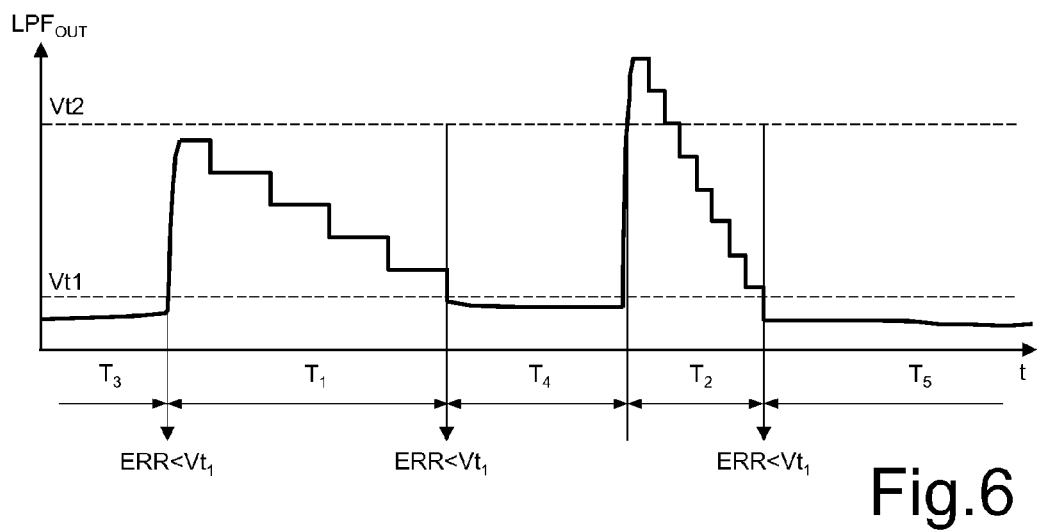

Operation of the algorithm described previously, as regards the recovery compensation mode and the slow-compensation mode is represented by way of example in FIG. 6, which shows the plot of the filtered output signal $LPF_{out}$ during the slow-compensation mode, in a first time interval T1, and during the recovery compensation mode, in a second interval time T2.

Moreover highlighted in the same FIG. 6, once again by way of example, are time intervals T3, T4 and T5, corresponding to a normal operating mode, in which the compensation algorithm does not intervene to modify the value of the control signal $S_c$ in so far as the offset on the output signal $V_{out}$ has a selected, or allowed, value. In particular, the filtered output signal $LPF_{out}$, indicative of the offset, and hence the resulting error, is lower, in absolute value, than the first threshold value $V_{t1}$.

The advantages of the solution described emerge clearly from the foregoing description.

In particular, the above solution provides a dynamic compensation, continuous in time during operation of the MEMS sensor device 1, of the offset present at the output, timely adapting to possible variations of the operating conditions and of the value of the same offset, for example, due to thermal or mechanical stresses.

The solution described may moreover be widely adapted to different conditions of use, for example by appropriate selection of the number of thresholds, of the values of the same thresholds, or of the range of variability of the cutoff frequency of the low-pass-filtering unit 18.

The aforesaid advantages are even more evident in the case of latest-generation devices, in which the requirements of miniaturization and general reduction of dimensions render the offset problem even more important.

Figure 7:
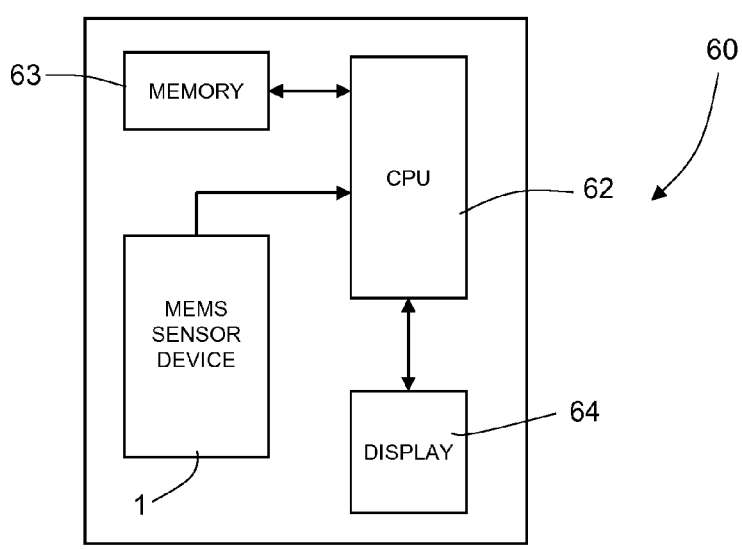
FIG. 7 shows a schematic block diagram of a portable electronic apparatus provided with the MEMS sensor device.

In this regard, FIG. 7 shows schematically a portable apparatus 60, such as for example a latest-generation smartphone, integrated in which is the MEMS sensor device 1, previously described in detail.

For example, the MEMS sensor device 1 detects a linear acceleration acting on the portable apparatus 60, during its operation.

The portable apparatus 60 comprises a central processing unit (CPU) 62, operatively connected to the MEMS sensor device 1, for receiving the output signal $V_{out}$ and implementing appropriate actions as a function of the value of this signal; the CPU 62 co-operates operatively with a memory 63, of a nonvolatile type.

For example, the CPU 62 may act on a current display mode of a display 64 of the portable apparatus 62, or activate given functions of the same portable apparatus 62.

Finally, it is clear that modifications and variations may be made to what has been described and illustrated herein, without thereby departing from the scope of the present disclosure.

In particular, it is evident that the solution described may be applied to any type of micromechanical detection structure (even different from the capacitive structure previously described by way of example) and to any type of associated trimming and offset-compensation structure, which is in any case controlled, as described previously in detail, by means of the control signal $S_c$ generated by the offset-compensation stage 12.

For example, the micromechanical detection structure may be of a resistive type.

The same compensation structure, of a capacitive type, previously described in detail may differ from the one illustrated in the example.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An offset-compensation circuit, comprising:
a control unit configured to control a compensation structure, to read an output signal during operation of a MEMS sensor, to obtain offset information about an offset present on the output signal, and to control the compensation structure as a function of the offset information;
a low-pass filtering module coupled to the control unit and configured to generate a filtered output signal as a function of said output signal, the control unit is configured to obtain said offset information as a function of the filtered output signal, low-pass filtering module has a cutoff frequency; and
a threshold-detector module, coupled to said low-pass filtering module, configured to receive said filtered output signal, and configured to perform a comparison between a value of said filtered output signal and at least one first threshold, and configured to generate a comparison signal, indicative of a result of the comparison, said control unit is configured to generate a control signal to control said compensation structure, as a function of said comparison signal, and the control unit is configured to modify a value of said cutoff frequency as a function of said comparison signal.

2. The circuit according to claim 1 wherein said first threshold is indicative of a first offset value on said output signal.

3. The circuit according to claim 1 wherein said control unit is configured to adjust the value of said cutoff frequency, as a function of an adjustment, in the absolute value, of an amount between said filtered output signal and said first threshold.

4. The circuit according to claim 1 wherein said threshold-detector module is configured to compare the value of said filtered output signal with at least one second threshold, higher in absolute value than said first threshold, to generate said comparison signal; and wherein said control unit is configured to vary a compensation mode to generate said control signal as a function of the value of said comparison signal.

5. The circuit according to claim 4 wherein said control unit is configured to implement: a fast-compensation mode, when said filtered output signal exceeds in absolute value said second threshold; and a slow-compensation mode, when said filtered output signal is, in absolute value, between said first threshold and said second threshold.

6. The circuit according to claim 5 wherein said fast-compensation mode envisages a first value of said cutoff frequency and a first operating frequency for said control unit; and wherein said slow-compensation mode envisages a second value of said cutoff frequency, lower than said first value, and a second operating frequency for said control unit, lower than said first operating frequency.

7. The circuit according to claim 6 wherein said control unit is configured to implement a fast-compensation strategy, upon power-on and upon exit from a condition of standby of said MEMS sensor, at a third value of said cutoff frequency, higher than said first value, and at a third operating frequency for said control unit, higher than said first operating frequency, to rapidly bring said reading circuit back into an allowed operating dynamic range.

8. The circuit according to claim 7 wherein said control signal is a digital signal having a given number of bits; and wherein, during said fast-compensation strategy, said control unit is configured to perform an iterative search on said bits, until a combination of said bits is determined such that said filtered output signal is comprised between a minimum value and a maximum value of said allowed dynamic range.

9. The circuit according to claim 1 wherein said control unit is configured to determine iteratively an incremental variation of the absolute value of said control signal, until said filtered output signal drops, in absolute value, below said first threshold.

10. The circuit according to claim 1 wherein said compensation structure comprises at least one trimmable electrical element.

11. The circuit according to claim 10 wherein s the MEMS sensor is of a capacitive type, and said at least one trimmable electrical element is a capacitor with variable capacitance.

12. A method, comprising:
reading an electrical detection quantity from a MEMS sensor during operation;
generating an output signal based on the electrical detection quantity;
obtaining offset information on an offset present on said output signal;
performing a low-pass filtering of said output signal for generating a filtered output signal, low-pass filtering having a cutoff frequency;

comparing a value of said filtered output signal with at least one first threshold for generating a comparison signal, indicative of a result of the comparison;

controlling a compensation structure as a function of said offset information to compensate for the offset on the output signal, the controlling including generating a control signal designed to control said compensation structure as a function of said comparison signal; and modifying a value of the cutoff frequency as a function of the comparison signal.

13. The method of claim 12 wherein the controlling includes determining iteratively an incremental variation of the absolute value of said control signal, until said filtered output signal drops, in absolute value, below said first threshold.

14. A device, comprising:
a MEMS sensor configured to generate an electrical detection quantity, the MEMS sensor includes a mobile terminal and a first and a second fixed terminal, a second terminal of the first trimmable capacitor is coupled to the first fixed terminal, and a second terminal of the second trimmable capacitor is coupled to the second fixed terminal;
a reading circuit coupled to the MEMS sensor and configured to process the electrical detection quantity and configured to generate an output signal;
an offset-compensation circuit, including:
a compensation structure coupled to an input of the reading circuit and configured to generate an electrical compensation quantity that is configured to compensate for an offset on the output signal, the compensation structure includes a first trimmable capacitor and a second trimmable capacitor, a first terminal of both the first trimmable capacitor and the second trimmable capacitor is coupled to the mobile terminal;
a control unit coupled to the compensation structure and configured to control the compensation structure, the control unit being configured to receive the output signal, to obtain offset information about the offset;
a low-pass filtering module coupled to the control unit and configured to generate a filtered output signal as a function of said output signal; and
a threshold-detector module, coupled to said low-pass filtering module, configured to receive said filtered output signal, and configured to perform a comparison between a value of said filtered output signal and at least one first threshold, and configured to generate a comparison signal, indicative of a result of the comparison, said control unit is configured to generate a control signal to control said compensation structure, as a function of said comparison signal.

15. The device of claim 14 wherein the low-pass filtering module has a cutoff frequency and the control unit is configured to modify a value of the cutoff frequency as a function of the comparison signal and the control unit is configured to adjust the value of the cutoff frequency, as a function of an adjustment, in the absolute value, of an amount between the filtered output signal and the first threshold.

16. An offset-compensation circuit, comprising:
a control unit configured to control a compensation structure, to read an output signal during operation of a MEMS sensor, to obtain offset information about an offset present on the output signal, and to control the compensation structure as a function of the offset information;
a low-pass filtering module coupled to the control unit and configured to generate a filtered output signal as a function of the output signal, the control unit is configured to obtain the offset information as a function of the filtered output signal, low-pass filtering module has a cutoff frequency; and
a threshold-detector module, coupled to the low-pass filtering module, configured to receive the filtered output signal, and configured to perform a comparison between a value of the filtered output signal and at least one first threshold, and configured to generate a comparison signal, indicative of a result of the comparison, the control unit is configured to generate a control signal to control the compensation structure, as a function of the comparison signal, and the control unit is configured to modify a value of the cutoff frequency as a function of the comparison signal, the threshold-detector module is configured to compare the value of the filtered output signal with at least one second threshold, higher in absolute value than the first threshold, to generate the comparison signal, and the control unit is configured to vary a compensation mode to generate the control signal as a function of the value of the comparison signal.

17. The circuit of claim 16 wherein the low-pass filtering module has a cutoff frequency and the control unit is configured to modify a value of the cutoff frequency as a function of the comparison signal.

18. The circuit of claim 17 wherein the control unit is configured to adjust the value of the cutoff frequency, as a function of an adjustment, in the absolute value, of an amount between the filtered output signal and the first threshold.

19. A device, comprising:
a MEMS sensor structure having an input, a first output, and a second output;
an offset compensation module coupled to the input and to the first and second outputs of the MEMS sensor structure;
a reading module coupled to the first and second outputs of the MEMS sensor structure;
a control module coupled to an output of the reading module and configured to receive an output signal, the control module including:
a low-pass filtering module configured to generate a filtered output signal as a function of the output signal;
a threshold-detector module, coupled to the low-pass filtering module, configured to receive the filtered output signal; and
a processing module coupled to the threshold-detector module and configured to generate a control signal for the offset compensation module, the processing module being configured to generate and provide a feedback signal to the low-pass filtering module.

20. The device of claim 19 wherein the reading module includes a charge amplifier that has a first input coupled to the first output of the MEMS sensor structure and a second input coupled to the second output of the MEMS sensor structure.

21. The device of claim 20 wherein the first and second inputs of the charge amplifier are coupled to respective outputs of the charge amplifier.

* * * * *